(12) United States Patent
Mokhtari et al.

(10) Patent No.: US 7,617,102 B2
(45) Date of Patent: Nov. 10, 2009

(54) SPEAKER IDENTIFYING APPARATUS AND COMPUTER PROGRAM PRODUCT

(75) Inventors: Parham Mokhtari, Kyoto (JP); Tatsuya Kitamura, Kyoto (JP); Hironori Takemoto, Kyoto (JP); Seiji Adachi, Kyoto (JP); Kiyoshi Honda, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 560 days.

(21) Appl. No.: 11/527,607

(22) Filed: Sep. 27, 2006

(65) Prior Publication Data

US 2007/0106511 A1    May 10, 2007

(30) Foreign Application Priority Data

Nov. 4, 2005    (JP)    ............................. 2005-321351

(51) Int. Cl.
*G10L 17/00* (2006.01)
(52) U.S. Cl. ......................... 704/246; 704/250; 704/236
(58) Field of Classification Search ................. 704/246, 704/243, 250, 236, 200, 247, 239, 240
See application file for complete search history.

(56) References Cited

U.S. PATENT DOCUMENTS 6,697,778 B1 *    2/2004    Kuhn et al. .................. 704/243

FOREIGN PATENT DOCUMENTS

JP    2004-258845    9/2004

OTHER PUBLICATIONS

"Speaker Verification Using Casual Factors of Speaker Characteristics". P. Mokhtari et al. Poster Session of the ATR Research Exposition 2005, Kyoto, Japan Nov. 10-11, 2005.

"Speaker Discriminating Features of Vocal-Tract Shapes and Their Inversion from Acoustics". P. Mokhtari et al. Proceedings of the 2006 Spring Meeting Acoustical Society of Japan, Tokyo, Japan, pp. 351-352, Mar. 14-16, 2006.

"Toward an Acoustic-Articulatory Model of Inter-Speaker Variability". P. Mokhtari et al. Proceedings of the 6th International Conference on Spoken Language Processing (ICSLP 2000), Beijing, China, Oct. 16-20, 2000.

(Continued)

*Primary Examiner*—Huyen X. Vo
(74) *Attorney, Agent, or Firm*—Harness, Dickey & Pierce, P.L.C.

(57) ABSTRACT

A speaker identifying apparatus includes: a module for performing a principal component analysis on predetermined vocal tract geometrical parameters of a plurality of speakers and calculating an average and principal component vectors representing speaker-dependent variation; a module for performing acoustic analysis on the speech data being uttered for each of the speakers to calculate cepstrum coefficients; a module for calculating principal component coefficients for approximating the vocal tract geometrical parameter of each of the plurality of speakers by a linear sum of principal component coefficients; a module for determining, by multiple regression analysis, a coefficient sequence for estimating principal component coefficients by a linear sum of the plurality of prescribed features, for each of the plurality of speakers; a module for calculating a plurality of features from speech data of the speaker to be identified, and estimating principal component coefficients for calculating the vocal tract geometrical parameter of the speaker to be identified, by a linear sum obtained by applying the coefficient sequence calculated by the regression analyzing module; and a module for identifying said speaker to be identified, by comparing the estimated principal component coefficients with the principal component coefficients calculated for each of the plurality of speakers by the principal component coefficient calculating module.

17 Claims, 11 Drawing Sheets

OTHER PUBLICATIONS

"Acoustic Characteristics of Phonetic and Speaker Variability in VT Area Functions". P. Mokhtari et al. Proceedings of the 2005 Autumn Meeting Acoustical Society of Japan, Sendai, Japan, pp. 417-418, Sep. 27-29, 2005.

"Individual Variation of the Hypopharyngeal Cavities and Its Acoustic Effects". T. Kitamura et al. Journal of the Acoustical Science and Technology, vol. 26, No. 1, pp. 16-26, Jan. 2005.

* cited by examiner

□ 1st SPEAKER
○ 2nd SPEAKER
◇ 3rd SPEAKER

□ 1st SPEAKER
○ 2nd SPEAKER
◇ 3rd SPEAKER

SPEAKER IDENTIFYING APPARATUS AND COMPUTER PROGRAM PRODUCT

CROSS-REFERENCE TO RELATED APPLICATION

This application claims foreign priority benefits under Title 35, United States Code, Section 119, of Japanese Patent Application No. 2005-321351, filed Nov. 4, 2005, the entire contents of which are hereby incorporated by reference in this application.

BACKGROUND OF THE INVENTION

1. Field of the Invention

The present invention relates to a speaker identifying technique for identifying or authenticating (hereinafter simply referred to as "identify") a speaker based on the voice of the speaker. More specifically, the present invention relates to a speaker identifying apparatus identifying, among a plurality of candidates, one having the highest probability as the speaker.

2. Description of the Background Art

In these days, as information comes to mean more and more in our social life, increasing number of problems arise in relation to the information, including information theft and wrongful use of portable telephones. In order to tackle such problems, a technique of determining whether a user is authenticated or not, or who is the user, that is, an individual identifying technique is desired for application to computers, automated teller machines of banks, portable telephones and the like.

Recent techniques for determining whether a user is authenticated or not often utilize biometrics information, typically including fingerprints, vein distribution on a palm, or iris patterns. Such information differs person to person, and is effective enough to deter "spoofing".

Individual identification using such information, however, often requires dedicated hardware, leading to undesirably expensive system.

Speech information is a kind of biometrics information. Speech information has been conventionally used for identifying an individual. Speech reflects geometrical features of one's speech organ, and therefore, it is considered suitable for individual identification.

As a prior art technique using speech, Japanese Patent Laying-Open No. 2004-258845 discloses a sound spectrogram authentication system that identifies an individual using information of sound spectrogram. According to the sound spectrogram authentication system, sound spectrogram of a user is pre-stored (enrolled) and, at the time of authentication, sound spectrogram of the speech as an input is collated with the enrolled sound spectrogram to determine whether the user should be authenticated or not. Here, the sound spectrogram authentication may be regarded as a technique for identifying an individual using the sound spectrogram.

SUMMARY OF THE INVENTION

The sound spectrogram is, basically, a graphical representation of change-over-time of frequency distribution (spectrum) in speech signals. Therefore, when the collation of sound spectrogram is to be mechanized, time-series spectra of speech as the object to be identified are calculated, and a time sequence of prescribed acoustic feature calculated from the spectra is used for collation.

Such an approach is functional as long as the precondition is upheld that individual differences of the acoustic features are in one-to-one correspondence to individual differences of the speech organ. Such a precondition, however, is not always met. Rather, it has been known that, as regards a vocal tract as the speech organ, vocal tracts of different shapes sometimes generate sounds of similar acoustic features. In such a case, correct identification may be difficult. Further, as time-series spectra are handled, the amount of data to be processed would be formidable and the process takes time.

In view of the foregoing, a speaker identifying apparatus capable of performing a speaker identifying process in a short period of time, reflecting the shape of individual speech organ with higher certainty has been desired.

Therefore, an object of the present invention is to provide a speaker identifying apparatus that can identify an individual in a short period of time, with the shape of individual speech organ better reflected.

Another object of the present invention is to provide a speaker identifying apparatus that can identify the speaker among a predetermined plurality of speakers in a short period of time, with the shape of individual speech organ better reflected.

An additional object of the present invention is to provide a speaker identifying apparatus that can reliably identify the speaker among a predetermined plurality of speakers in a short period of time, reflecting the shape of individual speech organ with higher certainty.

A further object of the present invention is to provide a speaker identifying apparatus that can reliably identify the speaker among a predetermined plurality of speakers reflecting the shape of individual speech organ with higher certainty and otherwise indicate failure of speaker identification.

According to a first aspect, the present invention provides a speaker identifying apparatus for identifying a speaker, based on a prescribed vocal tract geometrical parameter representing shapes of vocal tracts of a plurality of speakers uttering a prescribed phoneme, speech data of the plurality of speakers uttering the prescribed phoneme, and speech data of the speaker to be identified uttering the prescribed phoneme. The speaker identifying apparatus includes: a principal component analyzing module for performing principal component analysis on the vocal tract geometrical parameters of the plurality of speakers, and for calculating an average value of the vocal tract geometrical parameters and a prescribed number of higher order principal component vectors representing speaker-dependent variations of the vocal tract geometrical parameters; a feature calculating module for performing acoustic analysis on speech data of each of the plurality of speakers uttering the prescribed phoneme, and calculating a plurality of prescribed features related to the speech data; and a principal component coefficient calculating module for calculating principal component coefficients for approximating the vocal tract geometrical parameter of each of the plurality of speakers by a linear sum of the prescribed number of principal component vectors. The speaker identifying apparatus further includes: a multiple regression analyzing module for determining, by multiple regression analysis, a sequence of coefficients for estimating the principal component coefficients calculated by the principal component coefficient calculating module for the speaker of interest, by a linear sum of the plurality of prescribed features calculated by the feature calculating module; an estimating module for calculating the plurality of features related to the speech that are the same as those calculated by the feature calculating module from the speech data of the speaker to be identified uttering the prescribed phoneme, and for estimating principal component coefficients for calculating the vocal tract geometrical parameter of the speaker to be identified, by a linear sum obtained by applying the sequence of coefficients calculated by the multiple regression analyzing module to the plurality of features; and an identifying module for comparing the principal component coefficients estimated by the estimating module with the principal component coefficients calculated for each of the plurality of speakers by the principal component coefficient calculating module, and thereby for identifying the speaker to be identified. (claim 1)

The principal component analyzing module performs principal component analysis of the vocal tract geometrical parameter representing the shape of the vocal tract at the time of utterance of a prescribed phoneme by the plurality of speakers. The shape of vocal tract of each speaker can be approximated by a linear sum of the prescribed number of higher order ones of the resulting principal component vectors. The principal component coefficients for this purpose are calculated by the principal component coefficient calculating module. The feature calculating module performs an acoustic analysis on speech data obtained when the plurality of speakers utter the same phoneme as used for obtaining the vocal tract geometrical parameter. As a result, it becomes possible to obtain a prescribed plurality of acoustic features related to sound. The multiple regression analyzing module determines, using the linear sum of the features calculated for each speaker, the sequence of coefficients for estimating the principal component coefficients calculated for the speaker of interest, through multiple regression analysis. At the time of identifying process, the feature calculating module calculates the feature of the sound data of the speaker to be identified. The linear sum in accordance with the sequence of coefficients determined by the multiple regression analyzing module is applied to the feature, whereby the estimation module estimates the principal component coefficients for approximating the vocal tract geometrical parameter of the speaker to be identified by the linear sum of the principal component vectors. The identifying module compares the principal component coefficients with the principal component coefficients calculated by the principal component coefficient calculating module, and identifies the speaker of interest as one among the plurality of speakers.

What is necessary at the time of identification process is only the sound data of the speaker to be identified, and the vocal tract geometrical parameter is unnecessary. From the sound data, the principal component coefficients for calculating the vocal tract geometrical parameter are calculated, and the speaker of interest is identified based on the result. Different from identification using sound data only, here the result of estimation of the vocal tract shape is used for identification. Therefore, ambiguity in correspondence between the sound (voice) and the shape of the vocal tract is better avoided, allowing identification with higher reliability. Further, not the spectra themselves but the principal component coefficients are used for identification, and therefore, the time necessary for the process can be made shorter. As a result, a speaker identifying apparatus that can identify an individual in a short period of time, reflecting the shape of individual speech organ with higher certainty can be provided.

Preferably, the feature calculating module includes a cepstrum calculating module for performing cepstrum analysis on the speech data of each of the plurality of speakers uttering the prescribed phoneme, and calculating cepstrum coefficients up to a prescribed order, as the feature. (claim 2)

Cepstrum coefficient is an acoustic feature frequently used for acoustic processing and known to well represent acoustic characteristics, of which method of calculation has been established. The tool (computer programs) for that purpose is readily available. Therefore, highly reliable identification process can be realized easily.

The vocal tract geometrical parameter may include a vocal tract area function or a vocal tract width function of a speaker uttering the prescribed phoneme. (claims 3 and 6)

When the vocal tract area function is used as the vocal tract geometrical parameter, the shape of vocal tract of the speaker at the time of utterance can be approximated with high accuracy. When the vocal tract width function is used, the amount of data used can be reduced, and the process can be simplified.

Preferably, the feature calculating module includes: a cepstrum calculating module for performing cepstrum analysis on the speech data of each of the plurality of speakers uttering the prescribed phoneme, and calculating cepstrum coefficients up to a prescribed order; and a module for performing principal component analysis on the cepstrum coefficients up to the prescribed order, calculating principal component vectors representing speaker-dependent variation of the cepstrum coefficients up to the prescribed order, and calculating, as the feature, principal component coefficients for approximating the cepstrum coefficients up to the prescribed order by the principal component vectors for each of the plurality of speakers. (claim 7)

As described above, the cepstrum coefficient is a highly reliable feature frequently used in acoustic processing, and by principal component analysis thereon, principal component coefficients for approximating the cepstrum coefficients are calculated. By a limited number of high order principal component coefficients, speaker-dependent variation in cepstrum coefficients can be well described. Therefore, the number of data to be subjected to multiple regression analysis can be reduced, and the process can be simplified.

According to the second aspect, the present invention provides a computer program causing, when executed by an appropriate computer apparatus, the computer apparatus to operate as all the modules included in any of the speaker identifying apparatuses described above.

According to the third aspect, the present invention provides a computer program product including a computer-readable recording medium, on which the computer program described above is recorded.

According to the fourth aspect, the present invention provides a method of identifying a speaker, based on prescribed vocal tract geometrical parameters representing shapes of vocal tracts of a plurality of speakers uttering a prescribed phoneme, speech data of the plurality of speakers uttering the prescribed phoneme, and speech data of the speaker to be identified uttering the prescribed phoneme. The method includes the steps of: performing principal component analysis on the vocal tract geometrical parameters of the plurality of speakers, and calculating an average value of the vocal tract geometrical parameters and a prescribed number of higher order principal component vectors representing speaker-dependent variations of the vocal tract geometrical parameters; performing acoustic analysis on speech data of each of the plurality of speakers uttering the prescribed phoneme, and calculating a plurality of prescribed features related to the speech; calculating principal component coefficients for approximating the vocal tract geometrical parameter of each of the plurality of speakers by a linear sum of the prescribed number of principal component vectors; determining, by multiple regression analysis, a sequence of coefficients for estimating the principal component coefficients calculated in the step of calculating principal component coefficients for the speaker of interest, by a linear sum of the plurality of prescribed features calculated in the step of calculating principal component coefficients, for each of the plurality of speakers; calculating the plurality of features related to the speech that are the same as those calculated in the step of calculating the feature from the speech data of the speaker to be identified uttering the prescribed phoneme, and estimating principal component coefficients for calculating the vocal tract geometrical parameter of the speaker to be identified, by a linear sum obtained by applying the sequence of coefficients calculated in the step of determining by multiple regression analysis to the plurality of features; and comparing the principal component coefficients estimated in the estimating step with the principal component coefficients calculated for each of the plurality of speakers in the step of calculating principal component coefficients, and thereby identifying the speaker to be identified. (claim 14)

According to the fifth aspect, the present invention provides a speaker identifying apparatus for identifying a speaker, based on speech data of the speaker to be identified uttering a prescribed phoneme. The apparatus includes: a first storage for storing a parameter sequence for estimation prepared in advance, for estimating vocal tract geometrical parameters of a plurality of speakers, from a prescribed features obtained from speech data of the speakers; a second storage for storing, speaker by speaker, principal component coefficients for estimating the vocal tract geometrical parameters of the plurality of speakers from an average value of the prescribed features and a predetermined number of higher order principal component vectors representing speaker-dependent variation in the prescribed features, obtained from the speech data of the plurality of speakers; an estimating module for calculating the prescribed features from the speech data of the speaker to be identified uttering the prescribed phoneme, and estimating principal component coefficients for estimating the vocal tract geometrical parameter of the speaker to be identified, by a linear sum obtained by applying, to a plurality of the feature values, the parameter sequence for estimation stored in the first storage as a coefficient sequence; and an identifying module for comparing the principal component coefficients estimated by the estimating module with the principal component coefficients of each of the plurality of speakers stored in the second storage, and for identifying the speaker to be identified. (claim 15)

According to the sixth aspect, the present invention provides a method of identifying a speaker, based on speech data of the speaker to be identified uttering a prescribed phoneme. The method includes the steps of: storing, in prescribed first storage, a parameter sequence for estimation prepared in advance, for estimating vocal tract geometrical parameters of a plurality of speakers, from prescribed features obtained from speech data of the speakers; storing, speaker by speaker in prescribed second storage, principal component coefficients for estimating the vocal tract geometrical parameters of the plurality of speakers from an average value of the prescribed features and a predetermined number of higher order principal component vectors representing speaker-dependent variation in the prescribed features, obtained from the speech data of the plurality of speakers; calculating the prescribed features from the speech data of the speaker to be identified uttering the prescribed phoneme, and estimating principal component coefficients for estimating the vocal tract geometrical parameter of the speaker to be identified, by a linear sum obtained by applying, to a plurality of the feature values, the parameter sequence for estimation stored in the first storage as a coefficient sequence; and comparing the principal component coefficients estimated in the step of estimation with the principal component coefficients of each of the plurality of speakers stored in the second storage, and identifying the speaker to be identified. (claim 16)

According to the seventh aspect, the present invention provides a computer program product including a computer-readable recording medium, on which a computer program causing, when executed by a computer apparatus, the computer apparatus to execute all the steps of any of the methods described above is recorded.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
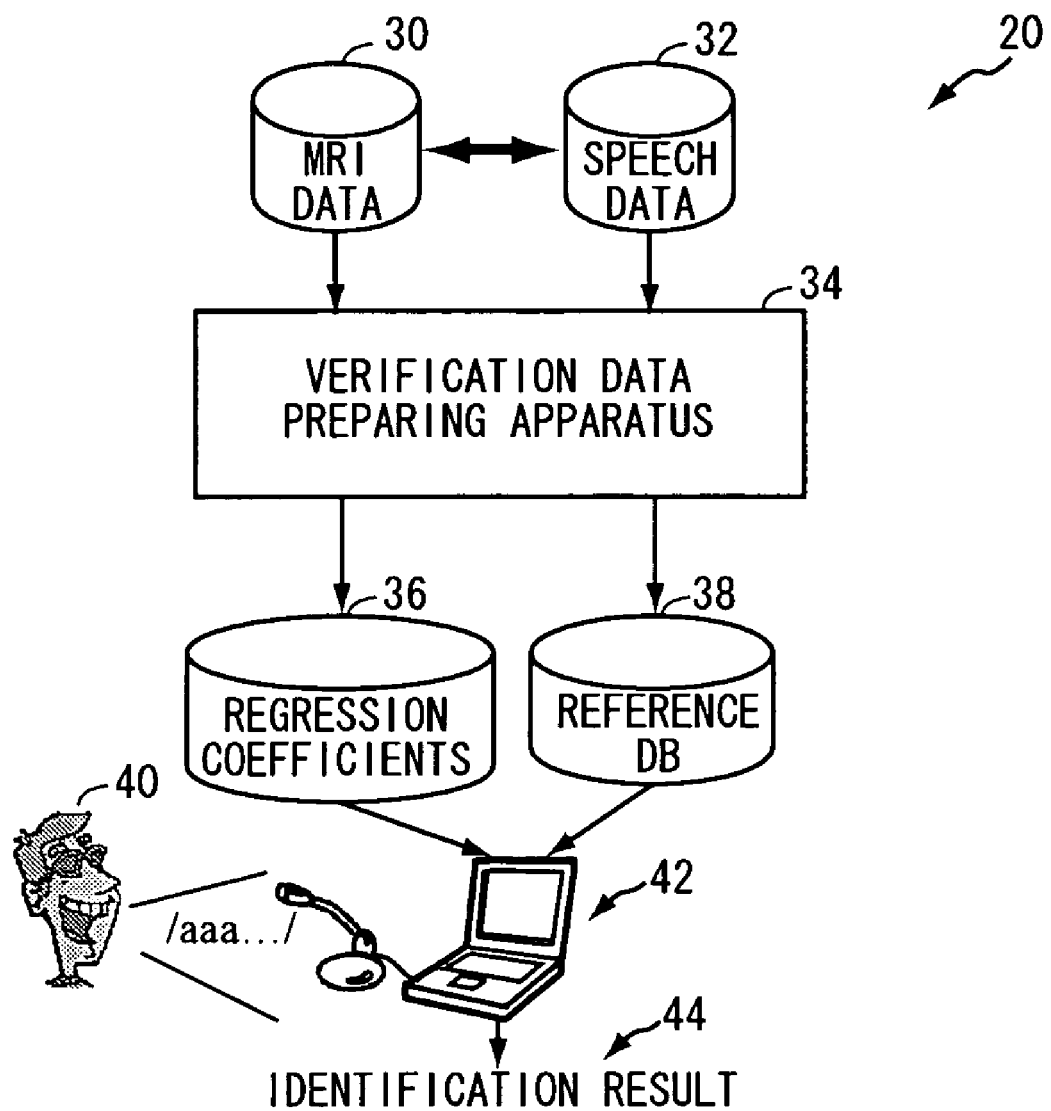
FIG. 1 is a block diagram representing a schematic configuration of a speaker identifying system 20 in accordance with a first embodiment of the present invention.

The embodiments describe below are directed to a process of finding a relational expression for estimating vocal tract geometrical feature from acoustic features, using a relation between the vocal tract feature of a speaker during an utterance obtained by MRI (Magnetic Resonance Imaging) and the acoustic features obtained from a sound signal of the utterance. At the time of verification, based on the acoustic features obtained from the voice of the speaker to be identified, the geometrical feature of the vocal tract of the speaker is estimated using the relational expression, and the estimated vocal tract geometrical feature is compared with pre-stored geometrical features of the vocal tracts of the speakers, whereby the speaker is verified and identified.

By way of example, vocal tract area function or vocal tract width function may be used as a representation of the shape of vocal tract. Vocal tract area function specifies a cross-sectional area of the vocal tract at a certain point on a supposed midline of the vocal tract, as a function of distance to the point from the glottis. As the vocal tract area function specifically defines the shape of vocal tract, higher accuracy of identification can be expected. Vocal tract width function specifies the width of vocal tract at a certain point of the midline of the vocal tract on the midsaggital plane of human body (width of vocal tract in the direction orthogonal to the midline of vocal tract), as a function of distance to the point from the glottis. As the representation of vocal tract shape, the amount of data is significantly smaller than that of vocal tract area function, and therefore, necessary processes are simpler.

Further, in the embodiments below, MRI image data are used for finding the vocal tract geometrical feature. The present invention, however, is not limited to such embodiments, and any means that provides knowledge of the shape of vocal tract may be used. By way of example, data provided by an apparatus that is capable of picking-up three-dimensional image of an organ such as a CT (Computed Tomography) may be used.

Throughout the figures of the embodiments, same portions are denoted by the same reference characters. They have the same functions and, therefore, detailed description thereof will not be repeated.

First Embodiment

<Configuration>

FIG. 1 is a block diagram of a speaker identifying system 20 using voice, in accordance with a first embodiment of the present invention. Referring to FIG. 1, speaker identifying system 20 includes: an MRI data storage 30 for storing MRI data obtained by picking up images of vocal tract shape at the time of utterance of a prescribed phoneme, for each of a plurality of speakers to be enrolled; speech data storage 32 for storing speech data obtained from the utterance made for image pickup, at a time close to the time of MRI data pickup (at the same time, if possible); and a verification data preparing apparatus 34 for preparing and outputting, based on the MRI data of a plurality of speakers stored in MRI data storage 30 and speech data of each speaker stored in speech data storage 32, reference data for identifying the plurality of speakers and regression coefficients used for estimating the vocal tract geometrical function of a speaker from the acoustic features of the speech of the speaker at the time of verification.

In the present embodiment, verification data preparing apparatus 34 finds a function representing the shape of vocal tract (hereinafter referred to as "vocal tract geometrical function") from the MRI data of a plurality of speakers to be enrolled, and by principal component analysis (hereinafter denoted by "PCA") on the function, principal components that mainly contribute to the variation of the shape of vocal tract derived from individual differences among speakers. Verification data preparing apparatus 34 further calculates coefficients for representing the vocal tract geometrical function of each speaker as a linear sum of the principal components. The coefficient is used as reference data for verifying and identifying each speaker. In the present embodiment, first and second principal components (PC I and PC II) are used.

At the time of verification (identification), it is impossible to pickup an MRI of the speaker. Therefore, in the present embodiment, speech or voice that can be readily obtained is used. The reference data are coefficients for representing the vocal tract geometrical function of each speaker as a linear function of principal components. Therefore, it becomes necessary to estimate the coefficients in some way or another from the acoustic features of speaker's voice. In the present embodiment, verification data preparing apparatus 34 calculates cepstrum coefficients from speaker's voice, and calculates coefficients for representing the principal component coefficients as the reference data of the speaker as a linear sum of cepstrum coefficients through multiple regression analysis. Cepstrum coefficient is an acoustic feature frequently used for acoustic processing and known to represent acoustic characteristics well. The method of its calculation has been established. Related tools are readily available. Therefore, application of this coefficients improves reliability of the identification process described below and facilitates preparation of the apparatus.

Speaker identifying system 20 further includes a regression coefficient storage 36 for storing the regression coefficients calculated by verification data preparing apparatus 34, and a reference database (hereinafter referred to as "reference DB") 38 for storing the reference data prepared by verification data preparing apparatus 34.

Cepstrum analysis is performed on the voice of the speaker to be verified/identified to calculate cepstrum coefficients, and a linear sum of the cepstrum coefficients is calculated using the regression coefficients stored in regression coefficient storage 36 as coefficients, whereby principal component coefficients for representing the vocal tract geometrical function of the speaker at the time of live utterance for identification (authentication) by the principal components can be estimated. By comparing the principal component coefficients with the principal component coefficients of a plurality of enrolled speakers stored in reference DB 38, a speaker 40 can be identified among the enrolled speakers.

In the present embodiment, speaker identifying system 20 further includes a verification apparatus 42 that performs the above-described process of cepstrum analysis on the voice of speaker 40 and calculation of principal component coefficients for the vocal tract geometrical function, identifies the speaker 40 among the plurality of enrolled speakers by comparing the calculated principal component coefficients with reference data stored in reference DB 38, and outputs an identification result 44. Speaker identifying system 20 in accordance with the present embodiment can actually be implemented with a single computer; however, verification apparatus 42 may be implemented with a separate computer.

Figure 2:
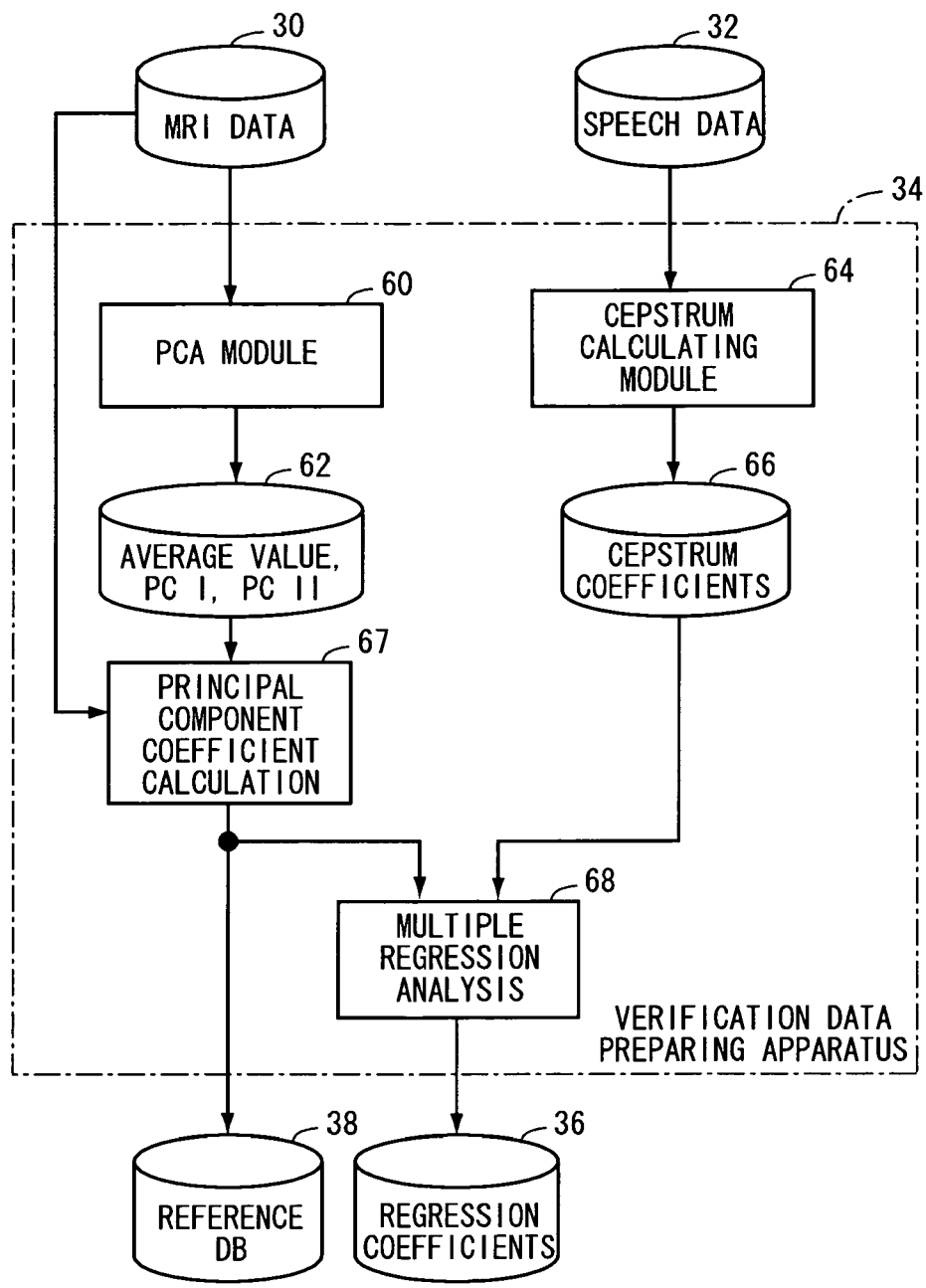
FIG. 2 is a detailed block diagram of a verification data preparing apparatus 34 shown in FIG. 1.

FIG. 2 is a detailed block diagram of verification data preparing apparatus 34. Referring to FIG. 2, verification data preparing apparatus 34 includes: a PCA module 60 performing PCA on MRI data (vocal tract geometrical data) of a plurality of speakers stored in MRI data storage 30 and outputting an average value of vocal tract geometrical data and principal components PC I and PC II; principal component storage 62 for storing the average value and PC I and PC II obtained by PCA module 60; and a principal component coefficient calculating module 67 calculating first and second principal component coefficients for representing the vocal tract geometrical function of each speaker stored in MRI data storage 30 as the linear sum of PC I and PC II, using the average value and PC I and PC II stored in principal component storage 62, and for storing the calculated coefficients in reference DB 38.

Verification data preparing apparatus 34 further includes: a cepstrum calculating module 64 performing cepstrum analysis on speech data of each speaker stored in speech data storage 32 and outputting cepstrum coefficients up to a prescribed order; cepstrum coefficient storage 66 for storing cepstrum coefficients calculated for each speaker by cepstrum calculating module 64; and a multiple regression analyzing module 68 for calculating, through multiple regression analysis, coefficients (linear sum coefficients) for calculating (estimating/approximating) the principal component coefficients of the corresponding speaker calculated by principal component coefficient calculating module 67 by a linear sum of cepstrum coefficients of each speaker stored in cepstrum coefficient storage 66, and storing the obtained coefficients in regression coefficient storage 36.

Assume that there are m speakers to be enrolled, and the order of cepstrum to be calculated is n. Here, the process performed by multiple regression analyzing module 68 is to determine coefficients $\alpha j$ and $\beta j$ ($0 \leq j \leq n$) from the following regression equations.

$$PC\ I_1 = \alpha_0 + \alpha_1 C_{1,1} + \alpha_2 C_{1,2} + \ldots + \alpha_n C_{1,n}$$

$$PC\ II_1 = \beta_0 + \beta_1 C_{1,1} + \beta_2 C_{1,2} + \ldots + \beta_n C_{1,n}$$

$$PC\ I_2 = \alpha_0 + \alpha_1 C_{2,1} + \alpha_2 C_{2,2} + \ldots + \alpha_n C_{2,n}$$

$$PC\ II_2 = \beta_0 + \beta_1 C_{2,1} + \beta_2 C_{2,2} + \ldots \alpha \beta_n C_{2,n}$$

$$\vdots$$

$$PC\ I_m = \alpha_0 + \alpha_1 C_{m,1} + \alpha_2 C_{m,2} + \ldots + \alpha_n C_{m,n}$$

$$PC\ II_m = \beta_0 + \beta_1 C_{m,1} + \beta_2 C_{m,2} + \ldots + \beta_n C_{m,n}$$

Here, $PC\ I_i$ and $PC\ II_i$ respectively represent principal component coefficients of the first and second principal components when the vocal tract geometrical function of the i-th speaker is represented as linear sum of the first and second principal components. Cij represents the j-th order cepstrum coefficient obtained from the voice of the i-th speaker.

Figure 3:
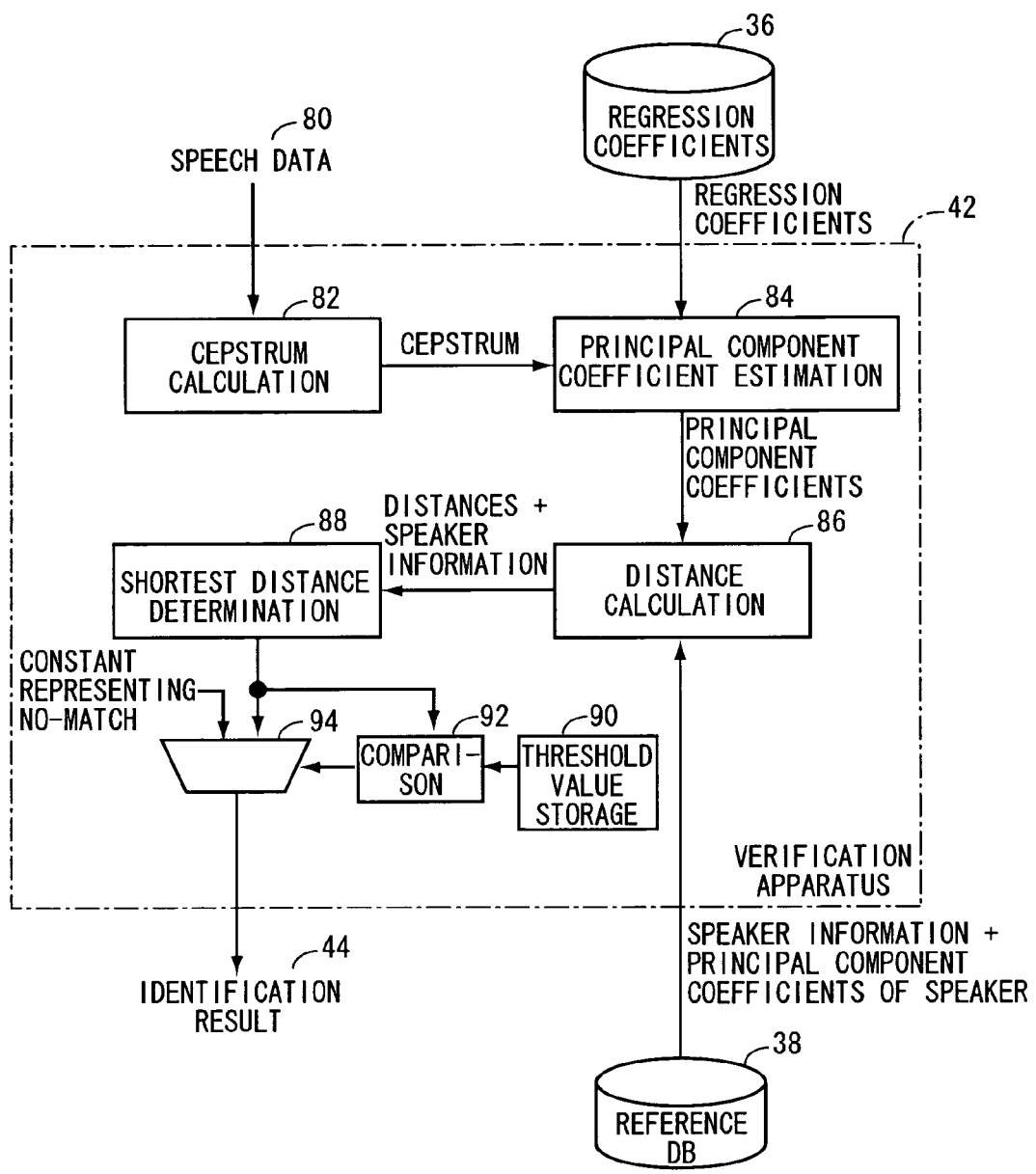
FIG. 3 is a detailed block diagram of verification apparatus 42 shown in FIG. 1

FIG. 3 is a detailed block diagram of verification apparatus 42. Referring to FIG. 3, verification apparatus 42 includes: a cepstrum calculating module 82 for calculating cepstrum coefficients of up to n-th order from speech data 80 input at the time of verification of speaker 40; and a principal component coefficient estimating module 84 applying the linear sum in accordance with the regression coefficients stored in regression coefficient storage 36 to the cepstrum coefficients up to the n-th order output from cepstrum calculating module 82, for estimating the principal component coefficients for representing the vocal tract geometrical function of speaker 40 at the time of utterance, by principal components PC I and PC II, for the first and second principal components PC I and PC II.

Verification apparatus 42 further includes: a distance calculating module 86 calculating, for each speakers, a Euclidean distance between a point defined by a set of principal component coefficients calculated by principal component estimating module 84 and a point defined by a set of principal component coefficients for each speaker stored in reference DB 38 in a space spanned by principal component coefficients PC I and PC II; a shortest distance determining module 88 for determining the shortest one among the distances calculated by distance calculating module 86, identifying a speaker corresponding to the distance, and outputting information specifying the speaker as well as the distance; threshold value storage 90 for storing beforehand a threshold value for determining whether the distance calculated by distance calculating module 86 is within a reasonable range; a threshold value comparing module 92 comparing the distance output by shortest distance determining module 88 with the distance stored in threshold value storage 90, and outputting a signal that assumes a first value when the calculated distance is not larger than the threshold value and otherwise a second value; and a selecting module 94 having first and second inputs connected to receive information related to the speaker output from shortest distance determining module 88 and a predetermined value indicating absence of any matching speaker, respectively, and selecting the output of shortest distance determining module 88 when the signal output from threshold value comparing module 92 is at the first value and otherwise selects a value indicating "no-match" and outputting the selected value as a result of identification 44. Specifically, verification apparatus 42 outputs the information indicating the identified speaker only when the shortest among the distances calculated by distance calculating module 86 is not longer than the prescribed threshold value, and otherwise, determines that there is no matching speaker 40 among the enrolled speakers and outputs an identification result 44 indicating a failure.

In the embodiment described above, utterance of a vowel is used for the verification process. It has been known that the shape of one's vocal tract is generally stable while he/she is uttering a vowel, and therefore, mis-identification resulting from unstable shape of the vocal tract would be reduced. For taking MRI data, the speaker utters a prescribed vowel, and the sound at that time is stored. As is well known, during scanning, MRI scanner makes large sounds. Therefore, it is difficult to record the uttered voice at the very same moment as the MRI scanning. However, when the speaker starts utterance immediately before the start of MRI operation and continues utterance for a prescribed time period after the end of imaging while the voice is recorded continuously, satisfactory voice data corresponding to the shape of vocal tract approximately the same as the shape scanned by MRI can be obtained.

The vowel mentioned above is a vowel common to all speakers, as collation under the same conditions would be impossible otherwise. It is also possible, however, to obtain MRI data and voice data of all speakers each uttering a plurality of vowels, and to perform verifying operation on each vowel.

Figure 4:
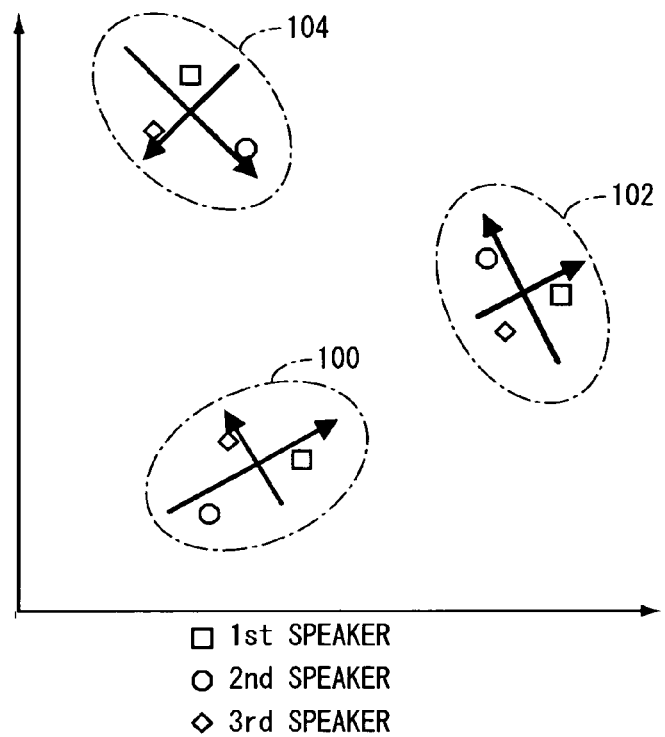
FIG. 4 shows results of principal component analysis on vocal tract geometrical function for a plurality of speakers uttering a plurality of vowels.

By way of example, acoustic data obtained through the above-described process from three speakers uttering three vowels will be described with reference to FIG. 4. For simplicity of drawing and description, FIG. 4 shows exemplary results of principal component analysis performed on cepstrum coefficients up to the second order, calculated from the voices obtained from three speakers uttering three vowels. In FIG. 4, the abscissa represents cepstrum coefficient of the first order, and the ordinate represents cepstrum coefficient of the second order.

Referring to FIG. 4, generally, different vowels have different cepstrum values. Therefore, cepstrum coefficients obtained for one vowel from a plurality of speakers are plotted in a relatively small region, while the regions of different vowels are far apart from each other, as can be seen from regions 100, 102 and 104 of FIG. 4. By performing principal component analysis on each of the regions 100, 102 and 104, the data for the identification process described above can independently be prepared for different vowels. Therefore, at the time of identifying process, a vowel may be selected at random, speakers to be identified are asked to utter the vowel, and using the result and using reference DB 38 and regression coefficient storage 36 prepared in advance for the vowel, verification can be done.

Figure 5:
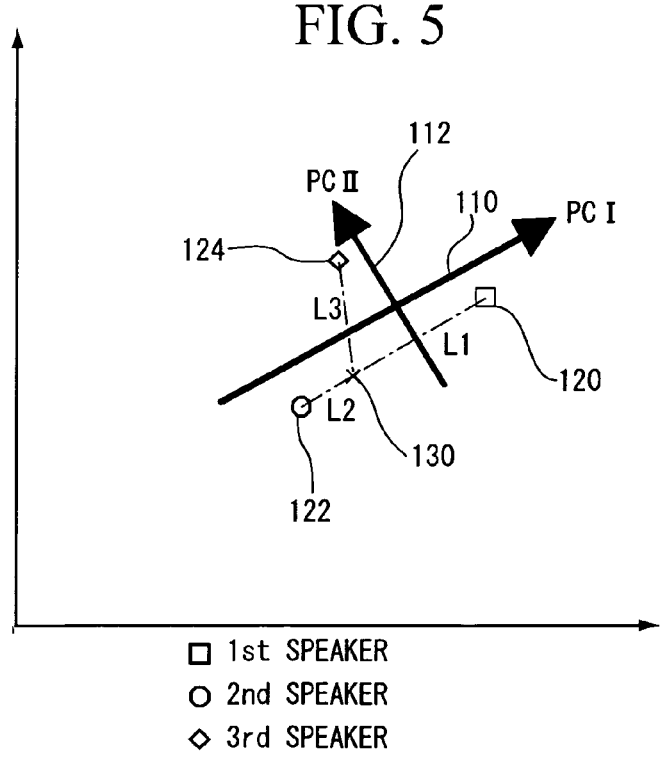
FIG. 5 shows verification principle.

FIG. 5 schematically shows the principles of the distance calculation by distance calculating module 86 and the shortest distance determination by shortest distance determining module 88. In FIG. 5 also, for simplicity of drawing and description, the number of speakers is three including the first to third speakers, and the order of cepstrum coefficients used is to the second order.

Referring to FIG. 5, the first order and second order cepstrum coefficients obtained from utterances of a certain phoneme of the first to third speakers, define points 120, 122 and 124 in the cepstrum coefficient space. By principal component analysis on these points, a first principal component axis 110 corresponding to the first principal component and a second principal component axis 112 corresponding to the second principal component are defined in the space.

By the cepstrum coefficients obtained from the voice data of the speaker, a point 130 is determined. The process at distance calculating module 86 is simple. Specifically, distance calculating module 86 calculates distances L1, L2 and L3 from the point 130 to points 120, 122 and 124, respectively. Shortest distance determining module 88 compares the distances L1, L2 and L3 with each other and selects the distance of the smallest value. In the example shown in FIG. 5, L2<L3<L1. Therefore, shortest distance determining module 88 selects L2. Shortest distance determining module 88 further determines that the speaker is the one who corresponds to the distance L2, that is, the second speaker, and outputs the result of determination indicating the speaker corresponding to the distance L2, as well as the distance L2.

The distance L2 is applied to threshold value comparing module 92. Threshold value comparing module 92 compares the threshold value stored in threshold value storage 90 with the distance L2, and if the distance L2 is not larger than the threshold value, applies a signal of a first value, and otherwise a signal of a second value, to selecting module 94.

To the first input of selecting module 94, information specifying the speaker corresponding to distance L2 is applied from shortest distance determining module 88. When the signal from threshold value comparing module 92 is of the first value, selecting module 94 selects the output of shortest distance determining module 88 and outputs the same as the result of identification 44. Otherwise, selecting module 94 selects a constant indicating that there is no corresponding speaker (no-match), and outputs the same as the result of identification 44.

For calculating the cepstrum coefficients from the voice data, it is necessary to select in advance a band of voice data that is most promising for highest performance. For this purpose, the following process is done beforehand. Using a plurality of frequency bands within the range of sampling frequency, cepstrum coefficients and the principal component coefficients are calculated in advance by applying test data. Using the calculated principal component coefficients, the principal components are estimated from the test data for identification. Errors between the estimated principal components and the principal components obtained from test MRI data are calculated. In this manner, errors are calculated for a plurality of frequency bands, and the frequency band that produced the smallest error is used for actual identification.

<Computer Implementation>

Speaker identifying system 20 in accordance with the embodiment described above may be implemented with a computer and a program executed on the computer. Note that the MRI data and the voice data of utterance by the speakers obtained while the MRI data are obtained are given. Further, for the identifying process, it is necessary to obtain voice data. Because most of the commercially available computers have functions for audio-related processing installed, a commercially available computer will suffice for the system.

Each of the functional blocks described above may be implemented, for example, with a program module of a computer. There may be various and many implementations through computer programs, however, and therefore, each function described above may be implemented with some portion of the computer program or programs.

Figure 6:
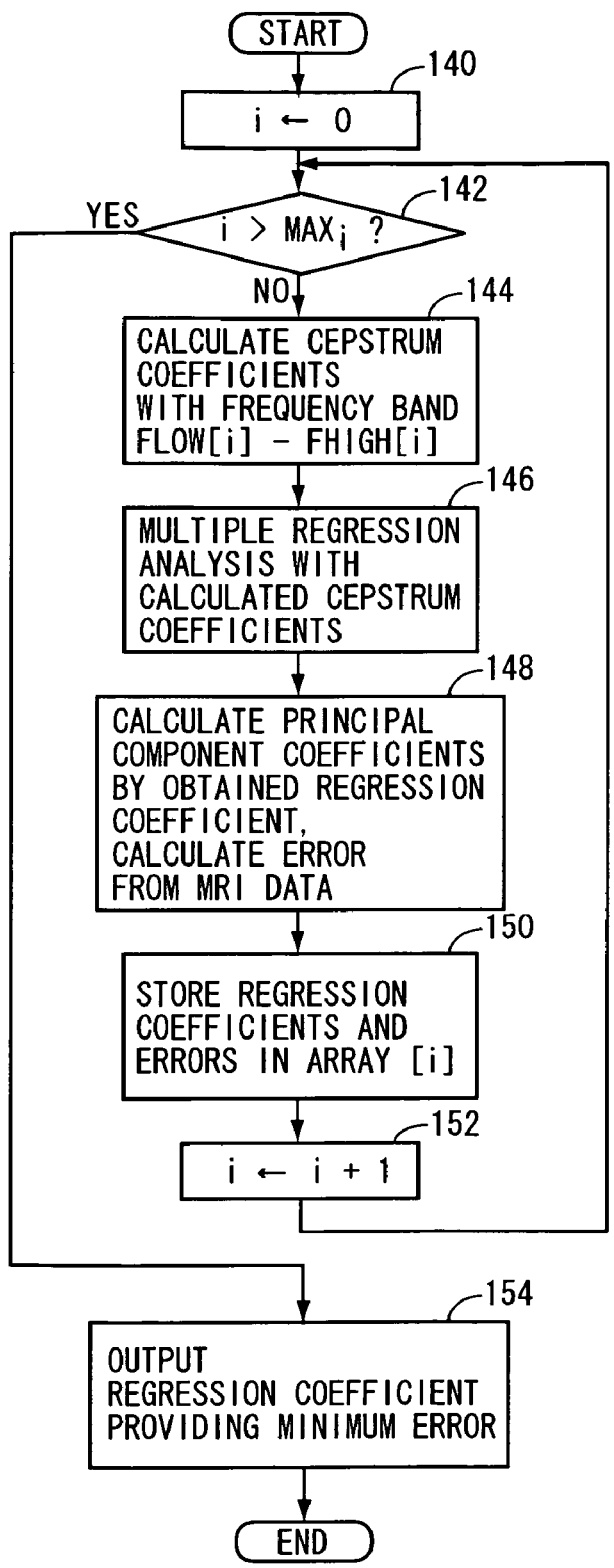
FIG. 6 is a flowchart of a program for implementing the verification data preparing apparatus 34 by a computer.

FIG. 6 is a flowchart of a program for realizing the verification data preparing apparatus 34 described above. Referring to FIG. 6, at step 140, "0" is assigned to an iteration control variable i. This is a part of initialization process.

At step 142, whether the value of variable i is larger than a predetermined maximum iteration number MAXi or not is determined. If it is YES, the flow proceeds to step 154. If it is NO, the flow proceeds to step 144. The maximum iteration number MAXi represents the number of frequency bands selected as the object of processing.

At step 144, i-th elements of arrays FLOW and FHIGH storing upper and lower limits of a plurality of frequency bands used beforehand for a test (these elements will be denoted as FLOW[i] and FHIGH[i], respectively) are read, and a cepstrum coefficients for the test data are calculated in frequency band FLOW[i]-FHIGH[i].

At step 146, using the calculated cepstrum coefficients, coefficients for finding the principal component of the vocal tract geometrical function obtained from known MRI data through a linear sum of cepstrum coefficients are calculated by multiple regression analysis. Based on the cepstrum coefficients obtained in this manner and the cepstrum coefficients calculated at step 144, the principal component coefficients are calculated using the linear sum of cepstrum coefficients at step 148, and an error from the original principal component coefficient is obtained. At step 150, the error calculated in this manner is stored as the i-th element of an array of error storage.

At step 152, the value of variable i is incremented by 1. The control returns to step 142.

When the value of variable i is larger than the maximum iteration number MAXi as a result of determination at step 142, the smallest one among the errors calculated and stored in the array so far is determined at step 154. Then, the regression coefficients that produced the smallest error is output.

In this manner, it becomes possible to perform the identification process using the frequency band that leads to the results of highest accuracy.

Figure 7:
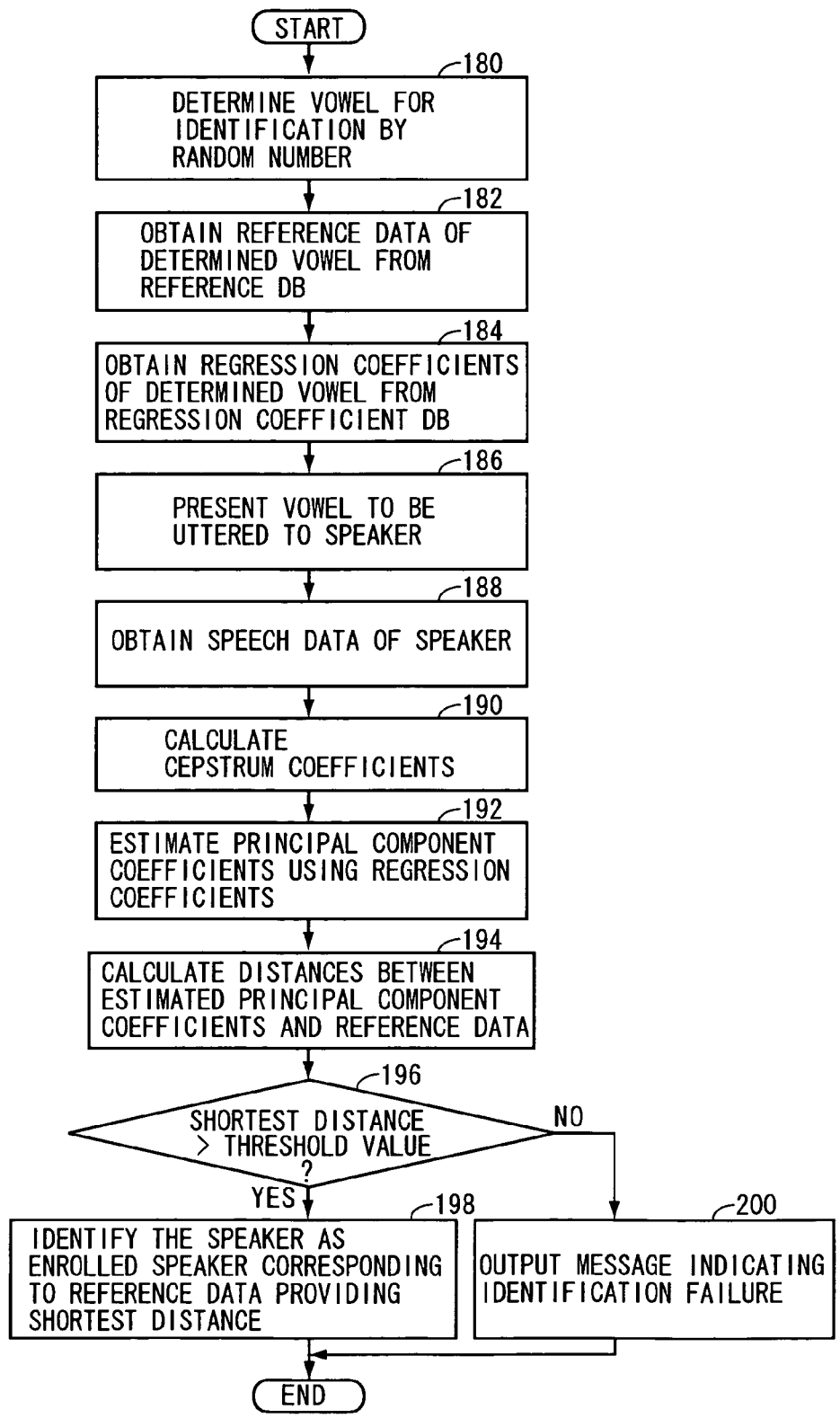
FIG. 7 is a flowchart of a program for implementing the verification apparatus 42 by a computer.

FIG. 7 is a flowchart representing a program implementing the verification apparatus 42 for the identification process. Referring to FIG. 7, first, a random number is generated at step 180. Based on the generated random number, which of a predetermined plurality of vowels should be used for verification is determined.

At step 182, the reference data of the determined vowel is obtained from reference DB 38 (see FIG. 1). Then, at step 184, the regression coefficients for the determined vowel are obtained from regression coefficient storage 36 (see FIG. 1).

At step 186, the vowel to be uttered is presented to the speaker to be identified. This presentation may be given as a message on an image screen, or an audio presentation.

At step 188, the voice data of the designated vowel uttered by the speaker is obtained. At step 190, cepstrum coefficients are calculated from the voice. At step 192, from the cepstrum coefficients and the regression coefficients obtained at step 184, linear sums of cepstrum coefficients are calculated. By this calculation, principal component coefficients for representing the vocal tract geometrical function when the speaker utters the vowel by the linear sum of principal components are estimated. At step 194, the distances between a point determined in the space spanned by the principal component vectors and the points determined by the reference data are calculated.

At step 196, the shortest of the distances calculated in this manner is determined, and whether the shortest distance is not larger than a prescribed threshold value or not is determined. If the shortest distance is not larger than the threshold value, the flow proceeds to step 198, otherwise to step 200.

At step 198, it is determined that the speaker is the enrolled speaker that corresponds to the point of the shortest distance, and a process for successful identification is executed. At step 200, it is determined that there is no matching speaker among the enrolled speakers, and a process indicating a failure of identification, such as outputting an identification failure message, is executed.

<Computer Hardware>

Figure 8:
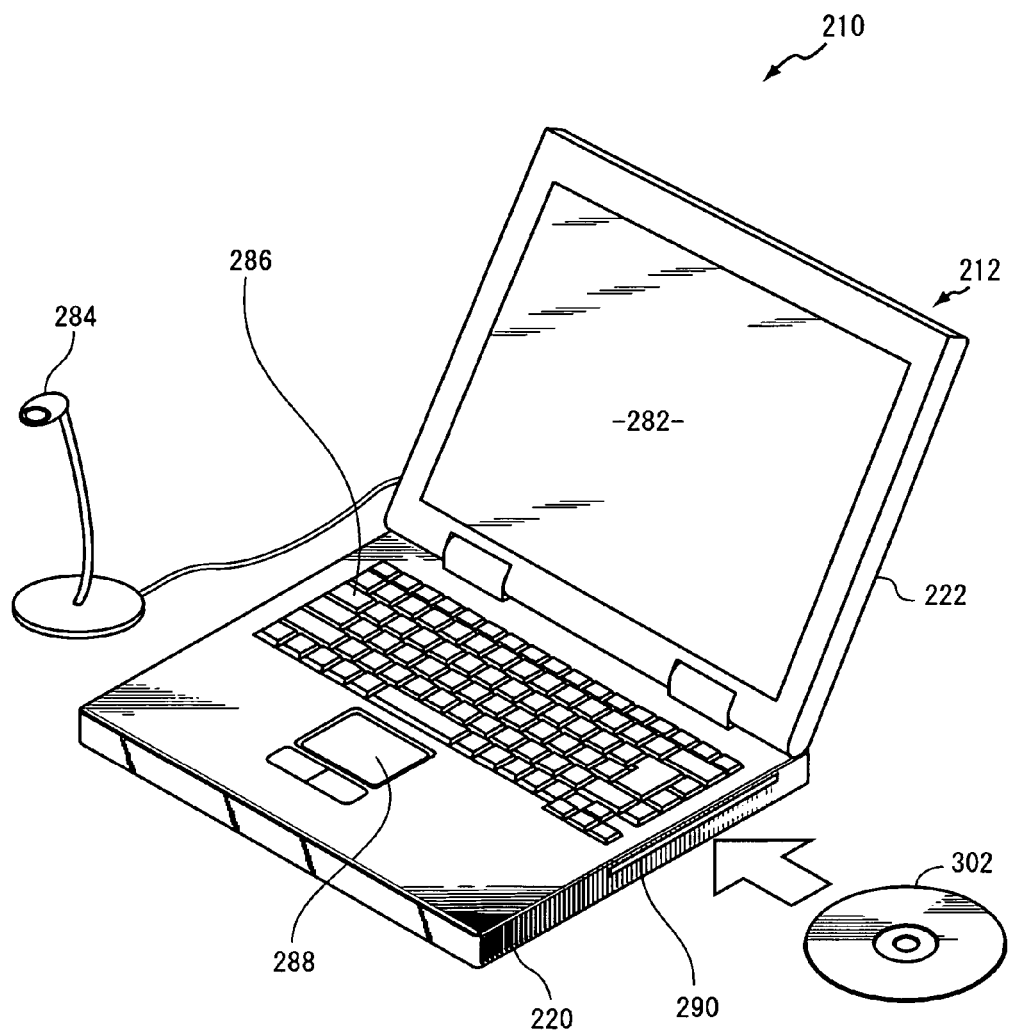
FIG. 8 shows an appearance of a computer system 210 implementing the speaker identifying system 20.
Figure 9:
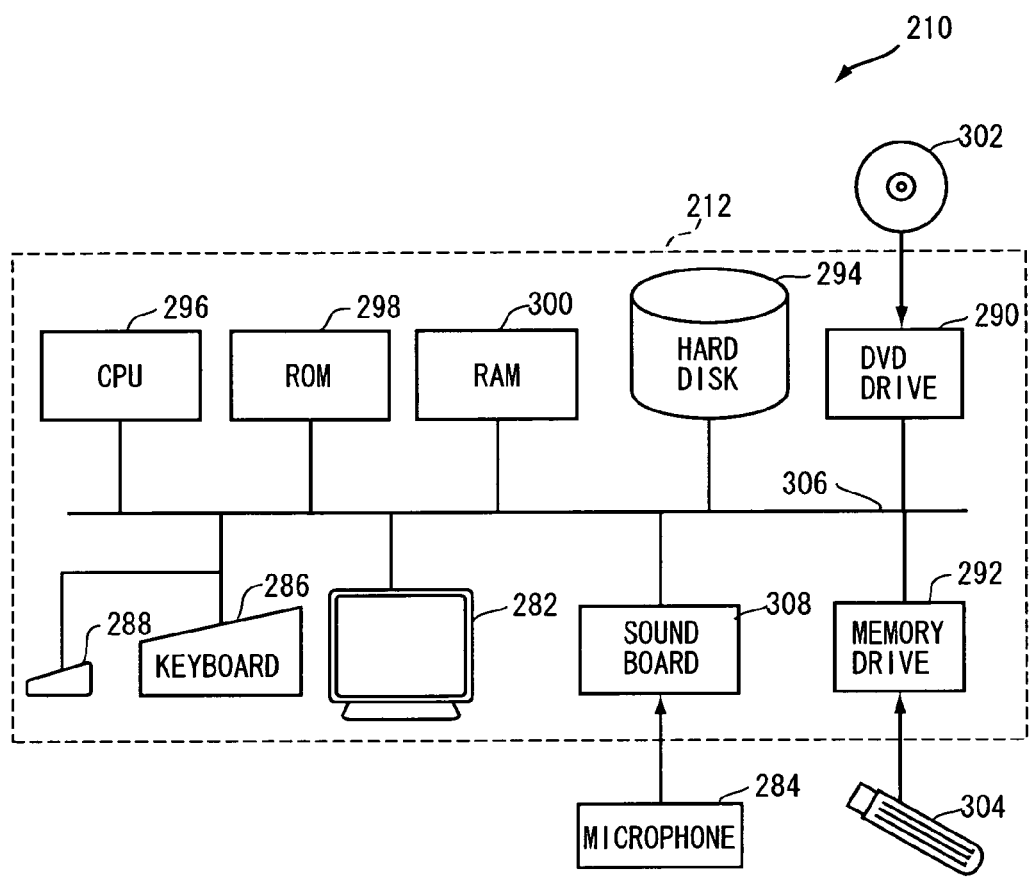
FIG. 9 is a block diagram representing the configuration of computer system 210 shown in FIG. 8.

FIG. 8 shows an appearance of a computer system 210 implementing the verification apparatus 42 of the present embodiment, and FIG. 9 is a block diagram of computer system 210. Computer system 210 shown here is only an example, and various other configurations may be used.

Referring to FIG. 8, computer system 210 includes a notebook type personal computer (hereinafter simply referred to as a "notebook") 212, and a microphone 284 connected to an audio input/output terminal of notebook 212. Notebook 212 includes a first housing 220 having a keyboard 286 and an electrostatic sensor pad 288 for moving a cursor, and a second housing 222 having a liquid crystal display 282, attached (hinged) to the first housing 220 to be rotatable about an upper one side of the first housing 220. Notebook 212 further includes a DVD (Digital Versatile Disc) drive 290 to which a DVD 302 can be loaded.

Referring to FIG. 9, notebook 212 further includes a bus 306 connected to DVD drive 290; a central processing unit (CPU) 296, an ROM (Read-Only Memory) 298 storing a boot-up program of notebook 212 and the like, an RAM (Random Access Memory) 300 providing a work area to be used by CPU 296 and an area for storing a program to be executed by CPU 296, and a hard disk 294 operating as the above-described regression coefficient storage 36, reference DB 38, MRI data storage 30, speech data storage 32, principal component storage 62, cepstrum coefficient storage 66 and the like, all connected to bus 306; a memory drive 292 connected to bus 306, to which a semiconductor memory 304 is mounted; and a sound board 308 connected to microphone 284 for digitizing analogue sound signal and the like.

The software to realize the system of the embodiment described above is distributed recorded on a recording medium such as DVD 302 or semiconductor memory 304, read through a reading apparatus such as DVD drive 290 or memory drive 292 to notebook 212, and stored in hard disk 294. When CPU 296 is to execute this program, the program is read from hard disk 294 and stored in RAM 300, and an instruction is read from an address designated by a program counter, not shown, and executed. CPU 296 reads the target data from a storage apparatus such as hard disk 294 or semiconductor memory 304, and stores the result of processing again to the storage apparatus such as hard disk 294 or semiconductor memory 304.

As the operations of notebook 212 per se are well known, detailed description thereof will not be given here.

The manner of software distribution is not limited to the distribution using storage medium fixedly storing the software as described above. By way of example, it may be distributed as data passed from another computer connected to a network. Further, a part of the software may be stored beforehand in hard disk 294 and remaining parts of the software may be taken to hard disk 294 through a network and may be integrated at the time of execution.

Generally, a modern program utilizes general purpose functions provided by an Operating System (OS) running on the computer or provided by third party programs, and execute these functions in an organized manner in accordance with a desired object, and attains the desired object. Therefore, it is obvious that a program or programs not including the general functions that may be provided by the OS or by a third party but designating only a combination of execution orders of the general functions should fall within the scope of the present invention, as long as the program or programs have the control structure that, as a whole, attains the desired object.

<Operation>

The speaker identifying system 20 described above operates in the following manner. The operation of speaker identifying system 20 has two phases. In the first phase, the regression coefficients are calculated from the MRI data and the voice data, and at the same time, reference DB 38 is prepared. In the second phase, using the regression coefficients and reference DB 38 formed in the first phase, the speaker is identified.

In the first phase, speaker identifying system 20 operates in the following manner. It is assumed that MRI data storage 30 and the corresponding speech data storage 32 have already been prepared.

Referring to FIG. 2, PCA module 60 calculates the vocal tract geometrical function of each speaker from MRI data stored in MRI data storage 30, and performs principal component analysis thereon. As a result, an average value and first and second principal components of the vocal tract geometrical function are obtained. These are stored in principal component storage 62.

Principal component coefficient calculating module 67 calculates, based on the average value and the principal components stored in principal component storage 62 and on MRI data stored in MRI data storage 30, principal component coefficients for representing the vocal tract geometrical function of each speaker by a linear sum of principal components, and stores the result in reference DB 38 as reference data.

Cepstrum calculating module 64 calculates cepstrum coefficients up to a prescribed order, from the speech data of each speaker stored in speech data storage 32. Though not specifically repeated here, actually, this process may be repeated for a plurality of different frequency bands, and cepstrum coefficients calculated for the frequency band that eventually provides the best result should be used.

The cepstrum coefficients calculated for each speaker are stored in cepstrum coefficient storage 66.

Multiple regression analyzing module 68 calculates, through multiple regression analysis, coefficients for approximating principal component coefficients for each speaker calculated in principal component coefficient calculating module 67 by the linear sum of cepstrum coefficients for each speaker stored in cepstrum coefficient storage 66. The calculated regression coefficient is stored in regression coefficient storage 36.

Thus, the first phase ends.

The second phase is the identification phase. Referring to FIG. 3, when speech (voice) data 80 of a prescribed vowel is given from speaker 40, cepstrum calculating module 82 calculates cepstrum coefficients up to the same order, using the same frequency band as cepstrum calculating module 64 from the speech data 80. The cepstrum coefficients are applied to principal component coefficient estimating module 84.

Principal component coefficient estimating module 84 calculates a linear sum of cepstrum coefficients applied from cepstrum calculating module 82 using the regression coefficients stored in regression coefficient storage 36, and estimates the principal component coefficient of the speaker. The estimated principal component coefficients are applied to distance calculating module 86.

Distance calculating module 86 calculates Euclidean distances between a point determined in a space spanned by the principal component vectors and the points determined by the principal component coefficients of respective speakers stored in reference DB 38, by the principal component coefficients applied from principal component estimating module 84. Distance calculating module 86 adds information that specifies the enrolled speakers corresponding to the calculated Euclidean distances and applies the result to shortest distance determining module 88.

When the shortest of the applied distances is not larger than the prescribed threshold value stored in threshold value storage 90, shortest distance determining module 88, threshold value comparing module 92 and selecting module 94 output information specifying a speaker corresponding to the shortest distance as the result of identification 44. If the conditions described above are not satisfied, shortest distance determining module 88, threshold value comparing module 92 and selecting module 94 output identification result 44 indicating a failure of identification.

The operation of speaker identifying system 20 in the second phase is as described above.

As can be seen from the foregoing, according to the present embodiment, basically, the vocal tract geometrical function is used for the identification. Therefore, ambiguity in identification derived from ambiguity in correspondence between the sound (voice) and the shape of the vocal tract is better avoided as compared with speaker identification using voice only, allowing identification with higher reliability. Further, for identification, the voice of a speaker to be identified is used. Therefore, the system can be implemented by a common computer having an audio input/output, without necessitating any special equipment. Further, as the principal component coefficients are used for identification, the amount of data to be stored in regression coefficient storage 36 and reference DB 38 can be reduced as compared with an example using the vocal tract area function, and the identification of a user can be realized by a simple system.

Second Embodiment

In the first embodiment described above, cepstrum coefficients obtained from speech data are used to perform multiple regression analysis to obtain principal component coefficients of the vocal tract geometrical function. The present invention, however, is not limited to such an embodiment, and different acoustic features obtained from the speech data may be used. Further, the calculated cepstrum coefficients may not directly be used for multiple regression analysis. Rather, principal component analysis may be performed on the cepstrum coefficients, an average value and principal components of the cepstrum coefficients may be calculated, and converted to principal component coefficients to approximate the cepstrum coefficients obtained from each speaker by the linear sum of principal components, and multiple regression analysis may be performed using the converted coefficients as the features. In that case, corresponding process must be done on the speech (voice) of the speaker at the time of verification.

In the second embodiment, an apparatus will be described, in which cepstrum coefficients are calculated from speeches of enrolled speakers, the cepstrum coefficients are converted by PCA to principal component coefficients for approximating the cepstrum coefficient by a linear sum of principal components of the cepstrum coefficients (the coefficients for approximation will be referred to as "cepstrum principal component coefficients"), and multiple regression analysis is performed using the cestrum principal component coefficients and the principal component coefficients obtained by PCA of MRI data.

<Configuration>

Figure 10:
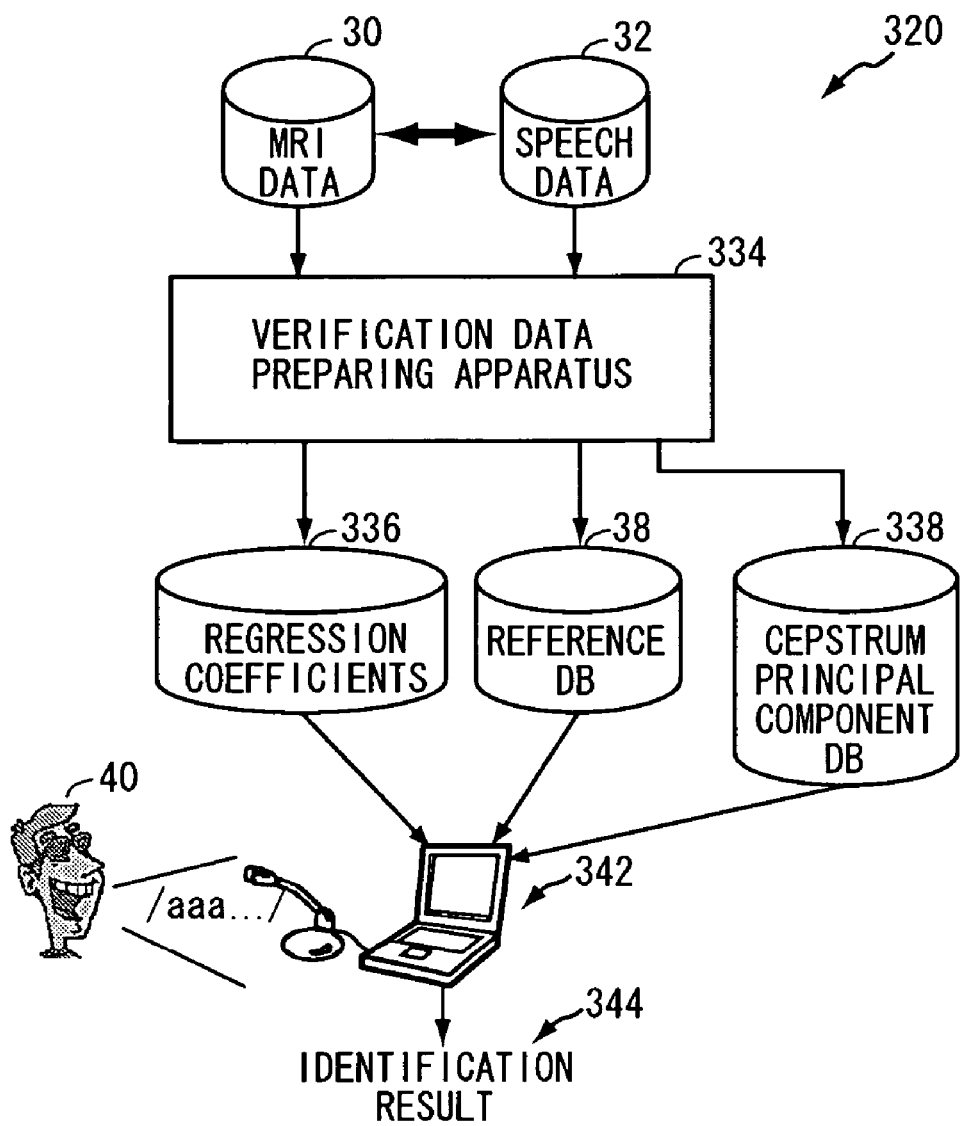
FIG. 10 is a block diagram representing a schematic configuration of a speaker identifying system 320 in accordance with a second embodiment of the present invention.

Referring to FIG. 10, a speaker identifying system 320 in accordance with a second embodiment includes: MRI data storage 30; speech data storage 32; and, in place of verification data preparing apparatus 34 in accordance with the first embodiment, a verification data preparing apparatus 334 outputting, based on the MRI data of a plurality of speakers stored in MRI data storage 30 and speech data of each speaker stored in speech data storage 32, reference data for identifying the plurality of speakers, regression coefficients used for estimating vocal tract geometrical function of the speaker to be identified from the acoustic features of the voice of the speaker at the time of verification (identification), and data obtained by PCA on the voice data applied from speech data storage 32.

Similar to the first embodiment, speaker identifying system 320 further includes: regression coefficient storage 336 for storing the regression coefficients calculated by verification data preparing apparatus 334; reference DB 38 for storing reference data prepared by verification data preparing apparatus 334; and a cepstrum principal component DB 338 for storing data of principal component of cepstrum coefficients, obtained as a result of PCA on the cepstrum coefficients obtained by verification data preparing apparatus 334 from the speech data of speakers.

Speaker identifying system 320 further includes a verification apparatus 342 for identifying a speaker 40 from a plurality of speakers and outputting the result of identification 344, using the speech data obtained from the voice of speaker 40, principal components of cepstrum coefficients stored in cepstrum principal component DB 338 and reference data stored in reference DB 38. Speaker identifying system 320 in accordance with the present embodiment can also be implemented by a single computer, or only the verification apparatus 342 may be implemented by an independent computer.

Figure 11:
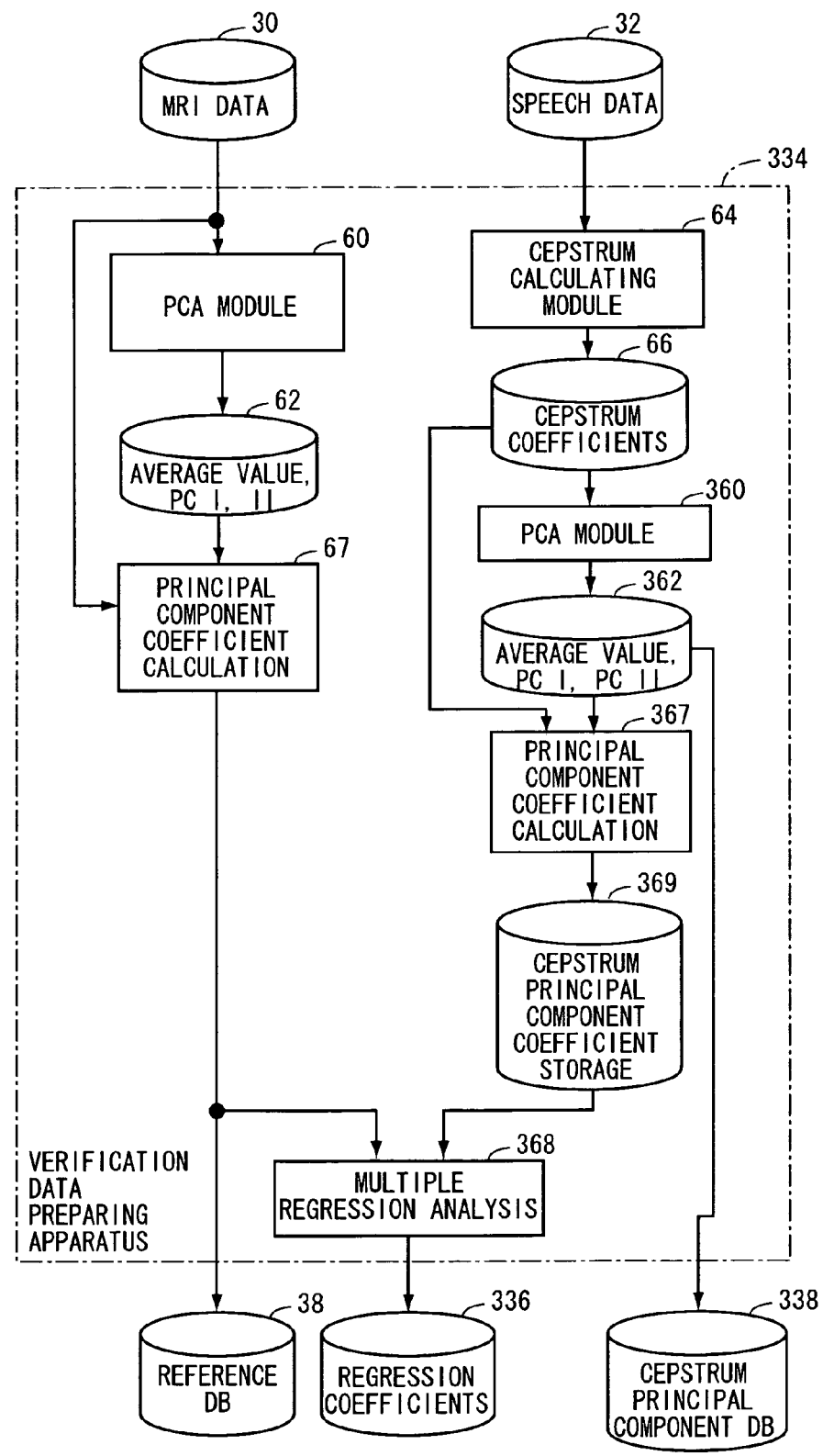
FIG. 11 is a detailed block diagram of a verification data preparing apparatus 334 shown in FIG. 10.

Referring to FIG. 11, verification data preparing apparatus 334 includes PCA module 60, principal component storage 62, principal component coefficient calculating module 67, cepstrum calculating module 64 and cepstrum coefficient storage 66, similar to those shown in FIG. 2.

Verification data preparing apparatus 334 further includes: a PCA module 360 performing principal component analysis on the cepstrum coefficients of each speaker stored in cepstrum coefficient storage 66, and calculating a set of principal components (tentatively referred to as $PC_B$) obtained by the principal component analysis on the cepstrum coefficients up to a prescribed order as well as an average value of the cepstrum coefficients to the prescribed order; cepstrum principal component storage 362 for storing the average value and the principal components $PC_B$ calculated by PCA module 360; a cepstrum principal component coefficient calculating module 367 for calculating, using the principal components $PC_B$ stored in cepstrum principal component storage 362, cepstrum principal component coefficients for approximating the cepstrum coefficients up to a prescribed order of each of the speakers stored in cepstrum coefficient storage 66 by a linear sum of principal components; a cepstrum principal component coefficient storage 369 for storing the cepstrum principal component coefficients calculated for each speaker by cepstrum principal component coefficient calculating module 367; and a multiple regression analyzing module 368 calculating, by multiple regression analysis, coefficients for calculating principal component coefficients for approximating the vocal tract geometrical function of a corresponding speaker by a linear sum of cepstrum principal component coefficients of each speaker stored in cepstrum principal component coefficient storage 369, and storing the result in regression coefficient storage 336.

In the first embodiment, a coefficient for approximating the principal component coefficients for approximating the vocal tract geometrical function of the speaker to be enrolled by a linear sum of cepstrum coefficients of the corresponding speaker is obtained through multiple regression analysis. In contrast, in the verification data preparing apparatus 334 of the second embodiment, the coefficients for approximating the same principal component coefficients by a linear sum of cepstrum principal component coefficients of the corresponding speaker obtained by principal component analysis on the cepstrum coefficients are obtained through multiple regression analysis.

When the principal component analysis on the cepstrum coefficient is performed and the coefficients obtained by multiple regression analysis using the result of PCA are used as described above, what is used for verification is cepstrum principal component coefficients only. Therefore, compared with an example in which the cepstrum coefficients are used directly, the process at verification apparatus 342 can be further simplified.

Figure 12:
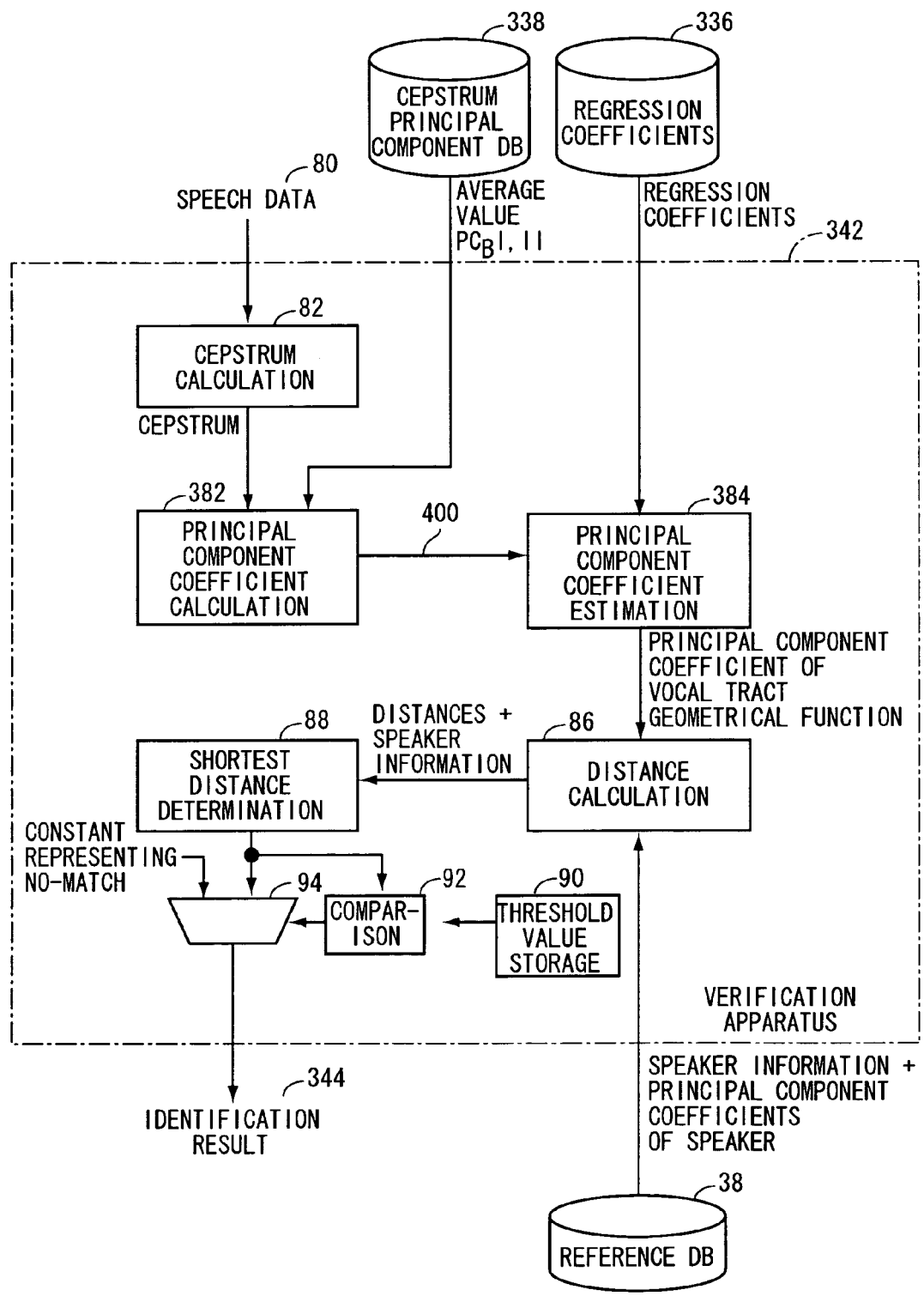
FIG. 12 is a detailed block diagram of a verification apparatus 342 shown in FIG. 10.

Referring to FIG. 12, verification apparatus 342 in accordance with the present embodiment includes, in addition to cepstrum calculating module 82, distance calculating module 86, shortest distance determining module 88, threshold value storage 90 and threshold value comparing module 92 of the first embodiment shown in FIG. 3, a principal component coefficient calculating module 382 for calculating coefficients (principal component coefficients) for approximating the cepstrum coefficients calculated by cepstrum calculating module 82 by a linear sum of principal components of the cepstrum coefficients stored in cepstrum principal component DB 338, and outputting the calculated coefficients as coefficient data 400; and a principal component coefficient estimating module 384 connected to receive the coefficient data 400 from principal component coefficient calculating module 382 and the regression coefficients from regression coefficient storage 336, respectively, applying a linear sum based on regression coefficients stored in regression coefficient storage 336 on coefficient data 400, estimating principal component coefficients for representing the vocal tract geometrical function at the time of utterance of speaker 40 by the principal components PC I and PC II, for the first principal component PC I and the second principal component PC II, respectively, and applying the same to distance calculating module 86.

<Operation>

Referring to FIGS. 10 to 12, speaker identifying system 320 operates in the following manner. The operation of speaker identifying system 320 also has two phases. The first phase is to build up the reference DB 38, regression coefficient storage 336 and cepstrum principal component DB 338. The second phase is to identify the target speaker, using the thus prepared reference DB 38, regression coefficient storage 336 and cepstrum principal component DB 338.

In the first phase, speaker identifying system 320 operates in the following manner. Here, only the verification data preparing apparatus 334, of which details are shown in FIG. 11, operates.

Referring to FIG. 11, data similar to those of the first embodiment are stored beforehand in MRI data storage 30 and speech data storage 32. PCA module 60, principle component storage 62 and principal component coefficient calculating module 67 operate in the similar manner as in the first embodiment. As a result, reference DB 38 is prepared. From principal component coefficient calculating module 67, the principal component coefficients for approximating the vocal tract geometrical function of each speaker by a linear sum of principal components are applied to multiple regression analyzing module 368.

Cepstrum calculating module 64 and cepstrum coefficient storage 66 also operate in the similar manner as in the first embodiment. As a result, from cepstrum coefficient storage 66 to PCA module 360, cepstrum coefficients up to a prescribed order of each speaker are applied.

PCA module 360 performs PCA on the cepstrum coefficients up to the prescribed order, and applies an average value of these cepstrum coefficients, and a prescribed number of principle component vectors of higher order among the principal component vectors representing speaker-dependent variation with respect to the average value, to cepstrum principal component storage 362. Cepstrum principal component storage 362 stores these. The average value and the cepstrum principal component vectors stored in cepstrum principal component storage 362 are stored as they are in cepstrum principal component DB 338, and cepstrum principal component DB 338 is thus built.

Cepstrum principal component coefficient calculating module 367 calculates, for each speaker, coefficients for approximating the cepstrum coefficients up to the prescribed order of each speaker stored in cepstrum principal component storage 362 by the linear sum of cepstrum principal component vectors and the average value stored in cepstrum principal component storage 362, and applies the calculated coefficients to cepstrum principal component coefficient storage 369. Cepstrum principal component coefficient storage 369 stores the same.

Multiple regression analyzing module 368 calculates, by multiple regression analysis, coefficients for approximating the principal component coefficients for approximating the vocal tract geometrical function of each speaker given from principal component coefficient calculating module 67 by the linear sum of cepstrum principal component coefficients of each speaker stored in cepstrum principal component coefficient storage 369, and applies the calculated coefficients to regression coefficient storage 336. As regression coefficient storage 336 stores these coefficients for each enrolled person and each phoneme, regression coefficient storage 336 is formed.

The operation of verification data preparing apparatus 334 in the first phase ends here.

In the second phase, speaker identifying system 320 operates in the following manner. In this phase, only the verification apparatus 342 of speaker identifying system 320 operates.

Referring to FIG. 12, cepstrum calculating module 82 operates in the similar manner as in the first embodiment, and calculates the cepstrum coefficients of the voice (speech) of the speaker to be identified. The cepstrum coefficients are applied to principal component coefficient calculating module 382.

Principal component coefficient calculating module 382 calculates cepstrum principal component coefficients for approximating the received cepstrum coefficients by a linear sum of the average value of cepstrum coefficients stored in cepstrum principal component DB 338 and the principal component vectors, and applies the result as coefficient data 400 to principal component coefficient estimating module 384.

Principal component coefficient estimating module 384 approximates, based on the coefficient data 400 and the regression coefficients applied from regression coefficient storage 336, the principal component coefficients for representing the vocal tract geometrical function of speaker 40 at the time of utterance by the average value and the principal components PC I and PC II stored in principal component storage 62 of FIG. 11, by a linear sum of coefficient data applied from coefficient data storage 400 using the regression coefficients applied from regression coefficient storage 336 as coefficients, for the first principal component PC I and the second principal component PC II, respectively, and applies the result to distance calculating module 86.

As in the first embodiment, distance calculating module 86 calculates the distance between a point defined by the principal components applied from principal component coefficient estimating module 384 and the points defined by the principal component coefficients stored for respective speakers in reference DB 38, and applies the calculated distances and the information representing the respective speakers to shortest distance determining module 88. Thereafter, operations similar to those of the first embodiment are performed by threshold value storage 90, threshold value comparing module 92 and selecting module 94, and information identifying a speaker or information indicating "no-match" is output as the identification result 344.

According to the present embodiment, principal component coefficient estimating module 384 of verification apparatus 342 calculates the principal components for approximating the vocal tract geometrical function by a linear sum using the regression coefficients stored in regression coefficient storage 336. As compared with the operation of principal component coefficient estimating module 84 of the first embodiment in which the principal component coefficients of the vocal tract geometrical function is calculated using a linear sum of cepstrum coefficients, the process can be simplified.

According to the first and second embodiments of the present invention as described above, in the first phase, prescribed acoustic features are obtained from voice data of the speakers. Using the features, principal component coefficients for approximating the vocal tract geometrical function of the speaker by a linear sum of principal components are estimated. These principal component coefficients are stored for each speaker.

In the second phase of verifying the speaker, the same features as the prescribed features obtained in the first phase are obtained from the voice data of the speaker. Using the features, the principal component coefficients for approximating the vocal tract geometrical function of the speaker by the linear sum of principal components obtained in the first phase are estimated. The obtained principal component coefficients are compared with the principal component coefficients obtained for each speaker and stored in the first phase. Then, the principal component coefficients that are closest to the principal component coefficients obtained in the second phase viewed from a prescribed reference point is specified, and the speaker corresponding to the specified principal component coefficients is determined to be the target speaker to be identified.

What is necessary at the time of verification is simply the voice data of the speaker, and the vocal tract geometrical function itself is unnecessary. Using the voice data, the principal component coefficients for calculating the vocal tract geometrical function are calculated, and the speaker is identified based on the result. Different from the identification using the voice data only, identification is done based on the result of estimated shape of the vocal tract. Therefore, ambiguity in correspondence between the sound (voice) and the shape of the vocal tract is better avoided, allowing identification with higher reliability than the prior art. Further, not the sound spectra themselves but the principal component coefficients of vocal tract geometrical function are used for identification, and therefore, the amount of data can be reduced and the time necessary for the process can be made shorter. As a result, speaker identification can be done in a short period of time, reflecting the shape of individual speech organ with higher certainty.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A speaker identifying apparatus for identifying a speaker, based on a prescribed vocal tract geometrical parameter representing shapes of vocal tracts of a plurality of speakers uttering a prescribed phoneme, speech data of said plurality of speakers uttering said prescribed phoneme, and speech data of said speaker to be identified uttering the prescribed phoneme, comprising:

principal component analyzing means for performing principal component analysis on said vocal tract geometrical parameters of the plurality of speakers, and for calculating an average value of said vocal tract geometrical parameters and a prescribed number of higher order principal component vectors representing speaker-dependent variations of said vocal tract geometrical parameters;

feature calculating means for performing acoustic analysis on speech data of each of the plurality of speakers uttering said prescribed phoneme, and calculating a plurality of prescribed features related to the speech data;

principal component coefficient calculating means for calculating principal component coefficients for approximating said vocal tract geometrical parameter of each of said plurality of speakers by a linear sum of said prescribed number of principal component vectors;

multiple regression analyzing means for determining, by multiple regression analysis, sequence of coefficients for estimating said principal component coefficients calculated by said principal component coefficient calculating means for the speaker of interest, by a linear sum of said plurality of prescribed features calculated by said feature calculating means;

estimating means for calculating said plurality of features related to the speech that are the same as those calculated by said feature calculating means from the speech data of the speaker to be identified uttering said prescribed phoneme, and for estimating principal component coefficients for calculating said vocal tract geometrical parameter of said speaker to be identified, by a linear sum obtained by applying the sequence of coefficients calculated by said multiple regression analyzing means to the plurality of features; and identifying means for comparing the principal component coefficients estimated by said estimating means with the principal component coefficients calculated for each of said plurality of speakers by said principal component coefficient calculating means, and thereby for identifying said speaker to be identified.

2. The speaker identifying apparatus according to claim 1, wherein said feature calculating means includes cepstrum calculating means for performing cepstrum analysis on the speech data of each of said plurality of speakers uttering said prescribed phoneme, and calculating cepstrum coefficients up to a prescribed order, as said feature.

3. The speaker identifying apparatus according to claim 2, wherein
said vocal tract geometrical parameter includes vocal tract area function of a speaker uttering said prescribed phoneme.

4. The speaker identifying apparatus according to claim 3, wherein
said identifying means includes
distance calculating means for calculating a value of a prescribed distance function, defined between the principal component coefficients estimated by said estimating means and the principal component coefficients calculated by said principal component coefficient calculating means for each of said plurality of speakers, and
means for identifying, among said plurality of speakers, the speaker for which distance calculated by said distance calculating means is the shortest, as said speaker to be identified.

5. The speaker identifying apparatus according to claim 2, wherein
said means for identifying the speaker to be identified includes
means for specifying the shortest of the distances calculated by said distance calculating means,
means for determining whether said shortest distance satisfies a prescribed relation with respect to a prescribed threshold value or not,
means responsive to a determination by said determining means that said shortest distance is not larger than said threshold value, for identifying said speaker to be identified as the speaker providing said shortest distance, and
means responsive to a determination by said determining means that said shortest distance is larger than said threshold value, for performing a process of indicating failure of speaker identification.

6. The speaker identifying apparatus according to claim 2, wherein
said vocal tract geometrical parameter includes vocal tract width function of a speaker uttering said prescribed phoneme.

7. The speaker identifying apparatus according to claim 1, wherein
said feature calculating means includes
cepstrum calculating means for performing cepstrum analysis on the speech data of each of said plurality of speakers uttering said prescribed phoneme, and calculating cepstrum coefficients up to a prescribed order, and
means for performing principal component analysis on said cepstrum coefficients up to the prescribed order, calculating principal component vectors representing speaker-dependent variation of said cepstrum coefficients up to the prescribed order, and calculating, as said feature, principal component coefficients for approximating said cepstrum coefficients up to the prescribed order by the principal component vectors for each of said plurality of speakers.

8. The speaker identifying apparatus according to claim 1, wherein
said vocal tract geometrical parameter includes vocal tract area function of a speaker uttering said prescribed phoneme.

9. The speaker identifying apparatus according to claim 1, wherein
said vocal tract geometrical parameter includes vocal tract width function of a speaker uttering said prescribed phoneme.

10. The speaker identifying apparatus according to claim 1, wherein
said identifying means includes
distance calculating means for calculating a value of a prescribed distance function, defined between the principal component coefficients estimated by said estimating means and the principal component coefficients calculated by said principal component coefficient calculating means for each of said plurality of speakers, and
means for identifying, among said plurality of speakers, the speaker for which distance calculated by said distance calculating means is the shortest, as said speaker to be identified.

11. The speaker identifying apparatus according to claim 1, wherein
said means for identifying the speaker to be identified includes
means for specifying the shortest of the distances calculated by said distance calculating means,
means for determining whether said shortest distance satisfies a prescribed relation with respect to a prescribed threshold value or not,
means responsive to a determination by said determining means that said shortest distance is not larger than said threshold value, for identifying said speaker to be identified as the speaker providing said shortest distance, and
means responsive to a determination by said determining means that said shortest distance is larger than said threshold value, for performing a process of indicating failure of speaker identification.

12. A computer program product including a computer readable recording medium, said recording medium having a computer program to operate as all means of the speaker identifying apparatus according to claim 1 recorded thereon.

13. A method of identifying a speaker, based on prescribed vocal tract geometrical parameters representing shapes of vocal tracts of a plurality of speakers uttering a prescribed phoneme, speech data of said plurality of speakers uttering said prescribed phoneme, and speech data of said speaker to be identified uttering the prescribed phoneme, comprising the steps of:
performing principal component analysis on said vocal tract geometrical parameters of the plurality of speakers, and for calculating an average value of said vocal tract geometrical parameters and a prescribed number of higher order principal component vectors representing speaker-dependent variations of said vocal tract geometrical parameters;
performing acoustic analysis on speech data of each of the plurality of speakers uttering said prescribed phoneme, and calculating a plurality of prescribed features related to the speech;
calculating principal component coefficients for approximating said vocal tract geometrical parameter of each of said plurality of speakers by a linear sum of said prescribed number of principal component vectors;
determining, by multiple regression analysis, a sequence of coefficients for estimating said principal component coefficients calculated in said step of calculating principal component coefficients for the speaker of interest, by a linear sum of said plurality of prescribed features calculated in said step of calculating principal component coefficients, for each of said plurality of speakers;

calculating said plurality of features related to the speech that are the same as those calculated in said step of calculating the feature from the speech data of the speaker to be identified uttering said prescribed phoneme, and estimating principal component coefficients for calculating said vocal tract geometrical parameter of said speaker to be identified, by a linear sum obtained by applying the sequence of coefficients calculated in said step of determining by multiple regression analysis to the plurality of features; and comparing the principal component coefficients estimated in said estimating step with the principal component coefficients calculated for each of said plurality of speakers in said step of calculating principal component coefficients, and thereby identifying said speaker to be identified.

14. A computer program product including a computer readable recording medium, said recording medium recording a computer program causing, when executed by a computing device, said computing device to execute all steps of the method according to claim 13.

15. A speaker identifying apparatus for identifying a speaker, based on speech data of said speaker to be identified uttering a prescribed phoneme, comprising:

first storage for storing a parameter sequence for estimation prepared in advance, for estimating vocal tract geometrical parameters of a plurality of speakers, from prescribed features obtained from speech data of the speakers;

second storage for storing, speaker by speaker, principal component coefficients for estimating the vocal tract geometrical parameters of said plurality of speakers from an average value of said prescribed features and a predetermined number of higher order principal component vectors representing speaker-dependent variation in said prescribed features, obtained from the speech data of said plurality of speakers;

estimating means for calculating said prescribed feature from the speech data of the speaker to be identified uttering said prescribed phoneme, and estimating principal component coefficients for estimating the vocal tract geometrical parameter of said speaker to be identified, by a linear sum obtained by applying, to a plurality of said feature values, said parameter sequence for estimation stored in said first storage as a coefficient sequence; and identifying means for comparing the principal component coefficients estimated by said estimating means with said principal component coefficients of each of said plurality of speakers stored in said second storage, and for identifying said speaker to be identified.

16. A method of identifying a speaker, based on speech data of said speaker to be identified uttering a prescribed phoneme, comprising the steps of:

storing, in prescribed first storage, a parameter sequence for estimation prepared in advance, for estimating vocal tract geometrical parameters of a plurality of speakers, from a prescribed features obtained from speech data of the speakers;

storing, speaker by speaker in prescribed second storage, principal component coefficients for estimating the vocal tract geometrical parameters of said plurality of speakers from an average value of said prescribed features and a predetermined number of higher order principal component vectors representing speaker-dependent variation in said prescribed features, obtained from the speech data of said plurality of speakers;

calculating said prescribed features from the speech data of the speaker to be identified uttering said prescribed phoneme, and estimating principal component coefficients for estimating the vocal tract geometrical parameter of said speaker to be identified, by a linear sum obtained by applying, to a plurality of said feature values, said parameter sequence for estimation stored in said first storage as a coefficient sequence; and comparing the principal component coefficients estimated in said step of estimation with said principal component coefficients of each of said plurality of speakers stored in said second storage, and identifying said speaker to be identified.

17. A computer program product including a computer readable recording medium, said recording medium recording a computer program causing, when executed by a computing device, said computing device to execute all steps of the method according to claim 16.

* * * * *